(12) United States Patent
Nakata

(10) Patent No.: US 6,698,820 B2
(45) Date of Patent: Mar. 2, 2004

(54) FENDER STRUCTURE OF VEHICLE

(75) Inventor: Yasumasa Nakata, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/214,194

(22) Filed: Aug. 8, 2002

(65) Prior Publication Data

US 2003/0052517 A1 Mar. 20, 2003

(30) Foreign Application Priority Data

Sep. 18, 2001 (JP) ........................................ 2001-282872

(51) Int. Cl.$^7$ .................................................. B60J 7/00
(52) U.S. Cl. ........................ 296/194; 296/189; 296/188; 296/195; 293/120
(58) Field of Search ................................ 296/194, 198, 296/188, 195, 187, 189; 293/120, 102

(56) References Cited

U.S. PATENT DOCUMENTS 3,831,997 A * 8/1974 Myers ......................... 296/189
3,848,886 A * 11/1974 Feustel et al. ............... 296/189

(List continued on next page.)

FOREIGN PATENT DOCUMENTS

GB 2 362 615 11/2001
JP 2000-177647 6/2000

OTHER PUBLICATIONS

Patent Abstracts of Japan, 11–198861, published Jul. 27, 1999.

Patent Abstracts of Japan, 11–180350, published Jul. 6, 1999.

Patent Abstracts of Japan, 11–321718, published Nov. 24, 1999.

Patent Abstracts of Japan, 2000–108841, published Apr. 18, 2000.

*Primary Examiner*—Kiran Patel
(74) *Attorney, Agent, or Firm*—Finnegan, Henderson Farabow, Garrett & Dunner, L.L.P.

(57) ABSTRACT

A fender structure of a motor vehicle. A fender includes a vertical wall portion, a mounting portion adapted to be mounted on an apron upper member of the vehicle, and an inclined portion formed between the vertical wall and the mounting portion, the inclined portion extending downward and inward as viewed in a width direction of the vehicle. The fender structure also includes first ribs formed on a lower surface of the inclined portion of the fender such that the first ribs face the apron upper member, fragile portions formed at a boundary between the vertical wall portion and the inclined portion, and second ribs formed on a portion of the vertical wall portion of the fender which is located above the apron upper member so as to extend in the vertical direction of the vehicle.

10 Claims, 6 Drawing Sheets

U.S. PATENT DOCUMENTS

| | | | | |
|---|---|---|---|---|
| 3,909,058 A | * | 9/1975 | Kramer et al. | 296/189 |
| 3,926,463 A | * | 12/1975 | Landwehr et al. | 296/189 |
| 4,359,120 A | * | 11/1982 | Schmidt et al. | 296/189 |
| 4,413,856 A | * | 11/1983 | McMahan et al. | 296/189 |
| 4,474,395 A | * | 10/1984 | Harloff et al. | 293/120 |
| 5,269,574 A | * | 12/1993 | Bhutani et al. | 293/102 |
| 5,340,154 A | * | 8/1994 | Scott | 296/198 |
| 5,806,889 A | * | 9/1998 | Suzuki et al. | 296/189 |
| 5,819,408 A | * | 10/1998 | Catlin | 296/189 |
| 5,836,641 A | * | 11/1998 | Sugamoto et al. | 296/189 |
| 5,934,729 A | * | 8/1999 | Baack | 296/189 |
| 5,957,512 A | * | 9/1999 | Inada et al. | 293/120 |
| 5,988,305 A | * | 11/1999 | Sakai et al. | 296/189 |
| 5,992,924 A | * | 11/1999 | Noritake et al. | 296/189 |
| 6,082,792 A | * | 7/2000 | Evans et al. | 296/189 |
| 6,237,990 B1 | * | 5/2001 | Barbier et al. | 296/193 |
| 6,247,745 B1 | * | 6/2001 | Carroll et al. | 296/189 |
| 6,290,272 B1 | * | 9/2001 | Braun | 296/189 |
| 6,302,477 B1 | * | 10/2001 | Satou | 296/189 |
| 6,315,339 B1 | * | 11/2001 | Devilliers et al. | 293/120 |
| 6,406,081 B1 | * | 6/2002 | Mahfet et al. | 293/120 |
| 6,412,836 B1 | * | 7/2002 | Mansoor et al. | 296/189 |
| 6,443,511 B2 | * | 9/2002 | Braun | 296/189 |
| 6,443,513 B1 | * | 9/2002 | Glance | 296/189 |
| 6,474,721 B2 | * | 11/2002 | Nishikawa et al. | 296/189 |
| 6,485,072 B1 | * | 11/2002 | Werner et al. | 296/189 |
| 6,488,312 B2 | * | 12/2002 | Knoethig et al. | 296/188 |
| 2001/0020796 A1 | * | 9/2001 | Delavalle et al. | 296/195 |
| 2002/0017805 A1 | * | 2/2002 | Carroll et al. | 296/189 |
| 2002/0070584 A1 | * | 6/2002 | Carroll et al. | 296/189 |
| 2002/0149214 A1 | * | 10/2002 | Evans | 293/120 |
| 2002/0190542 A1 | * | 12/2002 | Takeuchi et al. | 296/194 |

* cited by examiner

FENDER STRUCTURE OF VEHICLE

INCORPORATION BY REFERENCE

The disclosure of Japanese Patent Application No. 2001-282872 filed on Sep. 18, 2001, including the specification, drawings and abstract, is incorporated herein by reference in its entirety.

BACKGROUND OF THE INVENTION

1. Field of Invention

The invention generally relates to fender structures of motor vehicles, and more particularly to fender structures of motor vehicles, such as automobiles, in which a fender is mounted on a structural member of the vehicle.

2. Description of Related Art

A fender structure of a motor vehicle, such as an automobile, in which a fender is mounted on a structural member of the vehicle is known.

In the known vehicle fender structure as shown in FIG. 6, a support panel 102 is disposed on an apron upper member 100 as a structural member of a vehicle, such as an automobile. The support panel 102 includes a vertical wall 102A, a stepped portion 102B formed on the vertical wall 102A, a holding portion 102C formed on the stepped portion 102B, and a holding claw 104 formed above the vertical wall 102A to extend from the stepped portion 102B upward while being inclined toward the inside of the vehicle as viewed in the width direction of the vehicle. A vertical wall 106A of a fender 106 is supported between the holding portion 102C and the holding claw 104. The height of the holding claw 104 is set smaller than that of the holding portion 102C of the support panel 102. When a load exceeding a predetermined value is applied to the vertical wall 106A of the fender 106 from above by a collision body S, the vertical wall 106A slips off the holding claw 104 of the support panel 102 to move inward in the width direction of the vehicle as indicated by the two-dot chain line in FIG. 6. As a result, adjoining portions of the fender 106 and a hood 108 easily deform downward so as to absorb the energy.

In the fender structure of the vehicle, however, a large stress may be applied to an outer wall 106B of the fender 106 and cause damage to the outer wall 106B, when the vertical wall 106A of the fender 106 slips off the holding claw 104 of the support panel 102 as indicated by the two-dot chain line in FIG. 6.

SUMMARY OF THE INVENTION

It is one object of the invention to provide a fender structure of a motor vehicle, which is able to effectively absorb impact energy without causing damage to an outer wall of the fender.

To accomplish the above and/or other object(s), there is provided according to a first aspect of the invention a fender structure of a motor vehicle which includes a plurality of energy absorbers that absorb impact energy applied to the vehicle, at different stages upon a collision of the vehicle with an object.

When a load (or impact) is applied to the fender structure from above, the plurality of energy absorbers provided in the fender structure absorb impact energy at different stages or step by step. Thus, a large stress is prevented from being applied to the fender, and the impact energy can be effectively absorbed without damaging an outer wall of the fender.

According to a second aspect of the invention, there is provided a fender structure of a motor vehicle, which includes (a) a fender having a vertical wall portion, a mounting portion adapted to be mounted on an apron upper member of the vehicle, and an inclined portion formed between the vertical wall and the mounting portion, the inclined portion extending downward and inward as viewed in a width direction of the vehicle, (b) at least one first rib formed on a lower surface of the inclined portion of the fender such that the at least one first rib faces the apron upper member, (c) at least one fragile portion formed at a boundary between the vertical wall portion and the inclined portion, and (d) at least one second rib formed on a portion of the vertical wall portion of the fender which is located upwardly of the apron upper member, so as to extend in a vertical direction of the vehicle.

With the above-described fender structure, when a load is applied to the fender from above, the inclined portion of the fender is further inclined toward the apron upper member. As a result, the first rib formed on the lower surface of the inclined portion so as to face the apron upper member is brought into abutment on the apron upper member, and deforms to thereby absorb the energy. Subsequently, the fragile portion formed at the boundary between the vertical wall portion and the inclined portion of the fender breaks down to thereby further absorb the energy. Thereafter, the second rib formed in the vertical direction at a portion of the vertical wall portion of the fender which is located above the apron upper member is brought into abutment on the apron upper member, and deforms to thereby further absorb the energy. Thus, the impact energy acting on the fender can be absorbed at different stages or step by step, thus preventing a large acute stress from being applied to the fender all at once. Consequently, the impact energy can be effectively absorbed without damaging an outer wall of the fender.

In one preferred embodiment of the invention, the first ribs, the fragile portions, and the second ribs are arranged at certain intervals in a longitudinal direction of the vehicle to be located at predetermined positions of the fender so as to provide a predetermined energy absorbing capability at each of the predetermined positions. With this arrangement, an impact acting on an object can be effectively reduced, for example, even when the object is an adult pedestrian or a child pedestrian.

BRIEF DESCRIPTION OF THE DRAWINGS

The foregoing and other objects, features and advantages of the invention will become more apparent from the following description of exemplary embodiments with reference to the accompanying drawings, in which like numerals are used to represent like elements and wherein.

DETAILED DESCRIPTION OF PREFERRED EMBODIMENTS

A fender structure of a motor vehicle according to one exemplary embodiment of the Invention will be described with reference to FIGS. 1 to 5. In FIGS. 1 to 5, arrows denoted by FR, UP respectively represent the forward direction and upward direction of the vehicle, and arrow denoted by IN represents the inward direction as one of opposite width directions of the vehicle.

Figure 5:
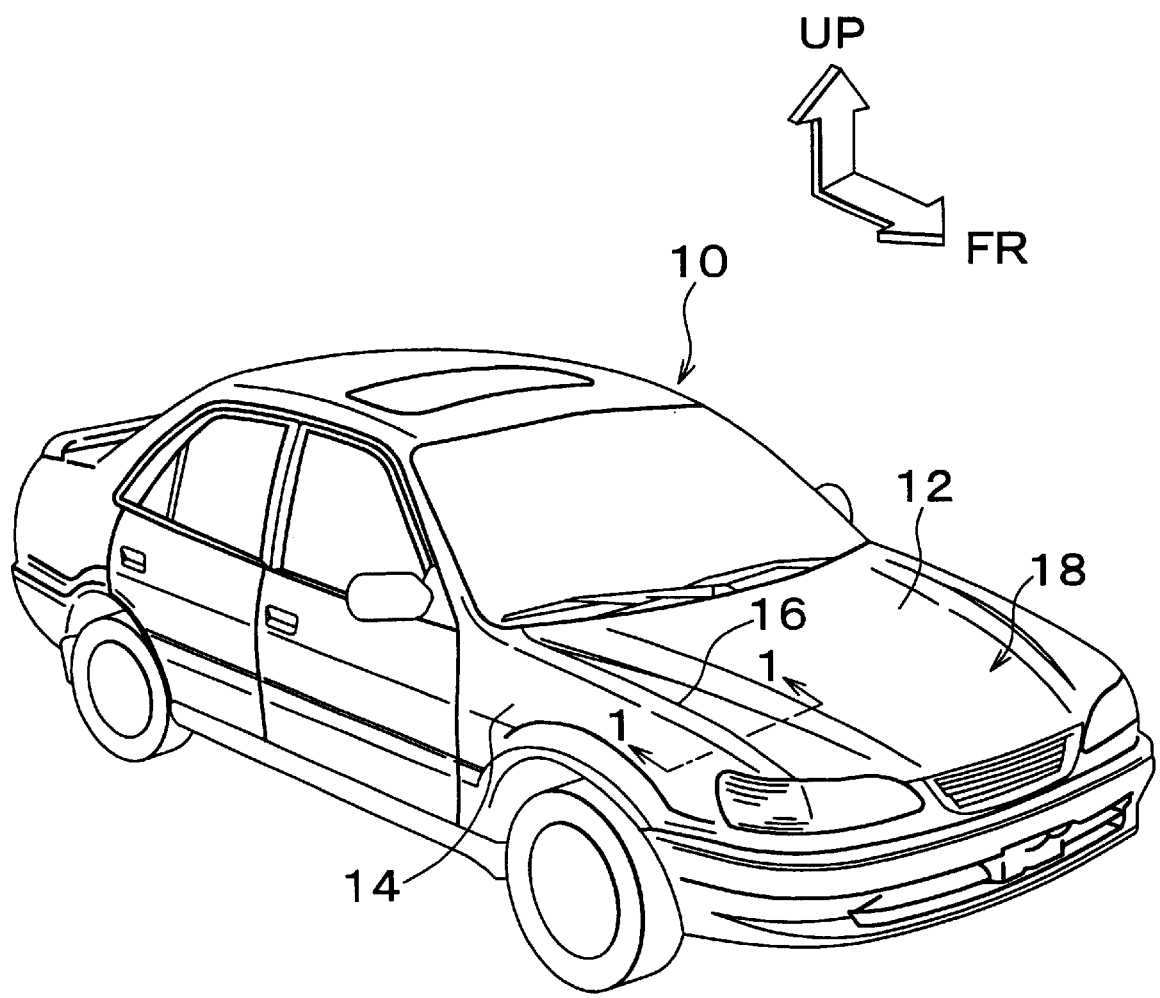
FIG. 5 is a perspective view showing a vehicle in which the fender structure of FIG. 1 is employed.
Figure 6:
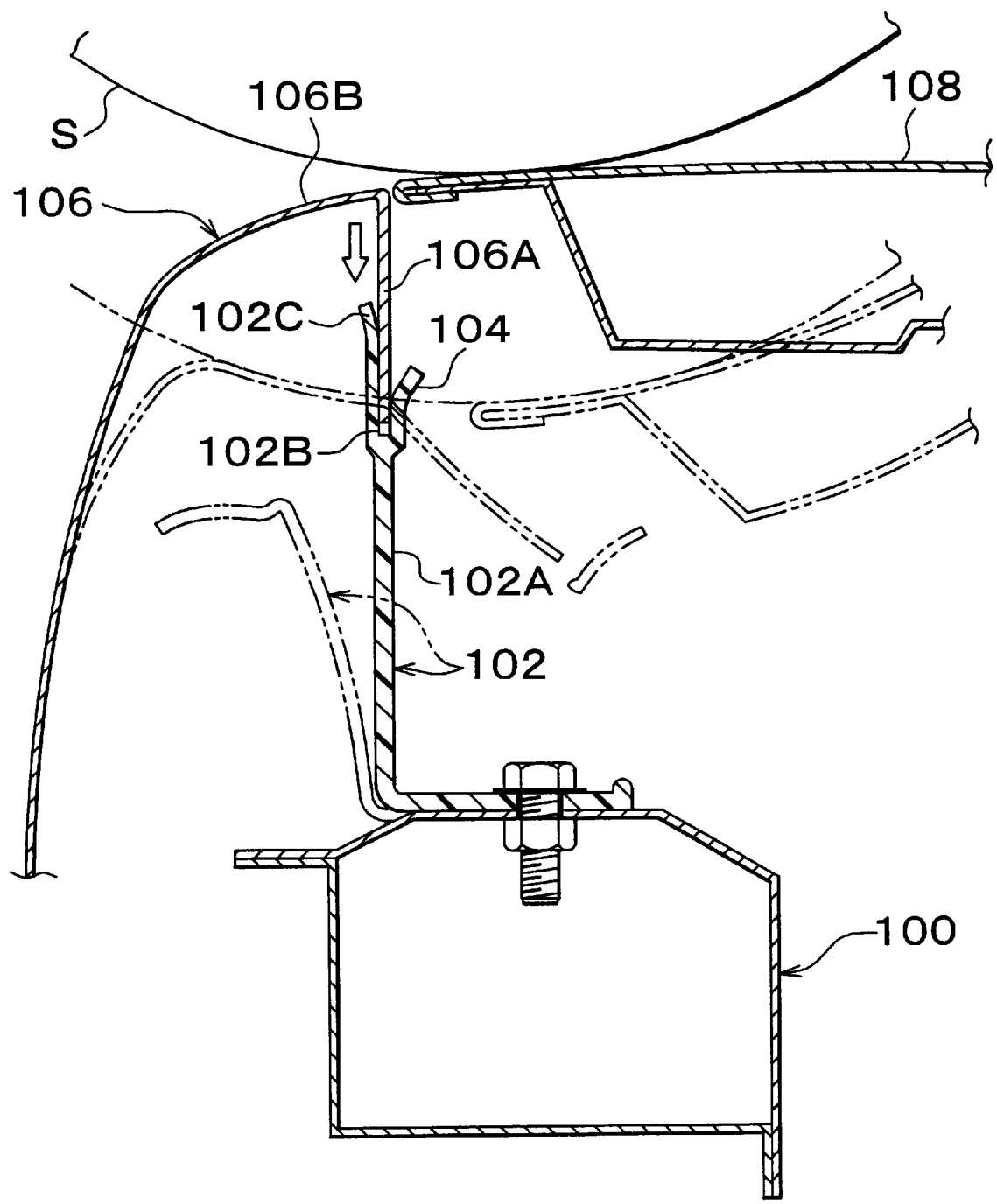
FIG. 6 is a cross-sectional view corresponding to that of FIG. 1, showing a known example of a fender structure of a vehicle.

In the embodiment shown in FIG. 5, a boundary 16 between a hood panel 12 of a vehicle body 10 and a fender 14 formed of resin extends in the longitudinal direction (i.e., running direction) of the vehicle at each of opposite end portions of a front hood 18 as viewed in the width direction of the vehicle.

Figure 1:
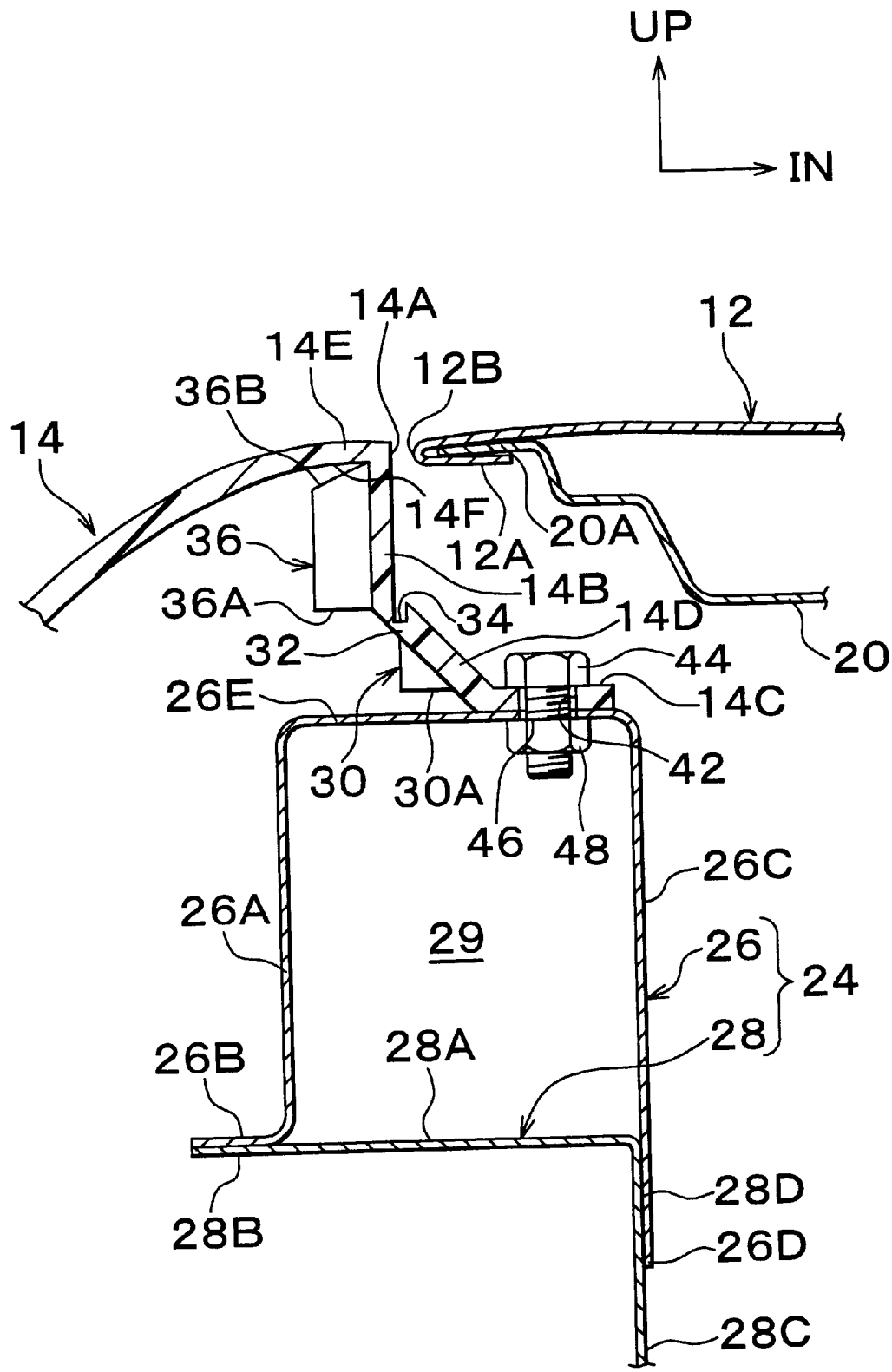
FIG. 1 is an enlarged cross-sectional view showing a fender structure of a vehicle according to one embodiment of the invention, taken along line 1—1 of the FIG. 5.

As shown in FIG. 1, a hood inner panel 20 is disposed on the lower side of the hood panel (which may be called a "hood outer panel") 12. The hood inner panel 20 is attached to the hood outer panel 12 such that an outer edge portion 12A of the hood outer panel 12 is fixed by hemming to an outer flange 20A of the hood inner panel 20 which projects outward in the vehicle width direction.

An apron upper member 24 as a structural member of the vehicle is located substantially below boundary lines 12B and 14A that provide the boundary 16 between the hood panel 12 and the fender 14, such that the apron upper member 24 extends in the longitudinal direction of the vehicle. The apron upper member 24 consists of an upper member 26 that forms an upper portion of the apron upper member 24, and a lower member 28 that forms a lower portion of the apron upper member 24.

The upper member 26 of the apron upper member 24 has an inverted U-shaped cross section as viewed in the longitudinal direction of the vehicle, with an opening of the U shape facing downward. On the other hand, the lower member 28 has an inverted L-shaped cross section as viewed in the longitudinal direction of the vehicle. Namely, the lower member 28 includes an upper horizontal wall 28A and a vertical wall 28C that extends downward from one end of the upper horizontal wall 28A. A flange 26B is formed at the lower end of a laterally (or widthwise) outer side wall 26A of the upper member 26, so as to extend outward in the width direction of the vehicle. The flange 26B is welded to a laterally outer end portion 28B of the upper horizontal wall 28A of the lower member 28.

The vertical wall 28C is formed at the laterally inner end of the upper horizontal wall 28A of the lower member 28 so as to extend downwardly of the vehicle. A lower end portion 26D of a laterally (or widthwise) inner side wall 26C of the upper member 26 is welded to a laterally inner side surface 28D formed at the upper portion of the vertical wall 28C.

With the apron upper member 24 thus constructed, the upper member 26 and the lower member 28 cooperate with each other to define a closed space that extends in the longitudinal direction of the vehicle.

The fender 14 includes a vertical wall 14B formed below the boundary line 14A so as to extend in the downward direction of the vehicle. The fender 14 also includes a mounting portion 14C to be attached to the upper member 26 of the apron upper member 24, and an inclined portion 14D formed between the vertical wall 14B and the mounting portion 14C so as to extend downward and inward (as viewed in the width direction) from the vertical wall 14B. A first rib 30 acting as an energy absorbing means is formed under the inclined portion 14D so as to face the upper wall 26E of the upper member 26 of the apron upper member 24. The first rib 30 has a triangular shape when viewed in the longitudinal direction of the vehicle. A lower surface 30A of the first rib 30 is substantially parallel to the upper wall 26E of the upper member 26 of the apron upper member 24.

A fragile portion 32, which also serves as an energy absorbing means, is formed at a boundary between the vertical wall 14B and the inclined portion 14D of the fender 14. The fragile portion 32 may take the form of a notch 34 formed between the vertical wall 14B and the inclined portion 14D with its opening facing upward. A second rib 36 also serving as an energy absorbing means is formed in the vertical direction of the vehicle on a laterally outer surface of the vertical wall 14B of the fender 14, to be located above the upper wall 26E of the upper member 26 of the apron upper member 24. Here, a lower surface 36A of the second rib 36 extends substantially parallel to the upper wall 26E of the apron upper member 24. On the other hand, an upper surface 36B of the second rib 36 is located in the vicinity of a back surface 14F of an outer wall 14E of the fender 14, and is inclined downward and outward from the laterally outer surface of the vertical wall 14B.

Figure 4:
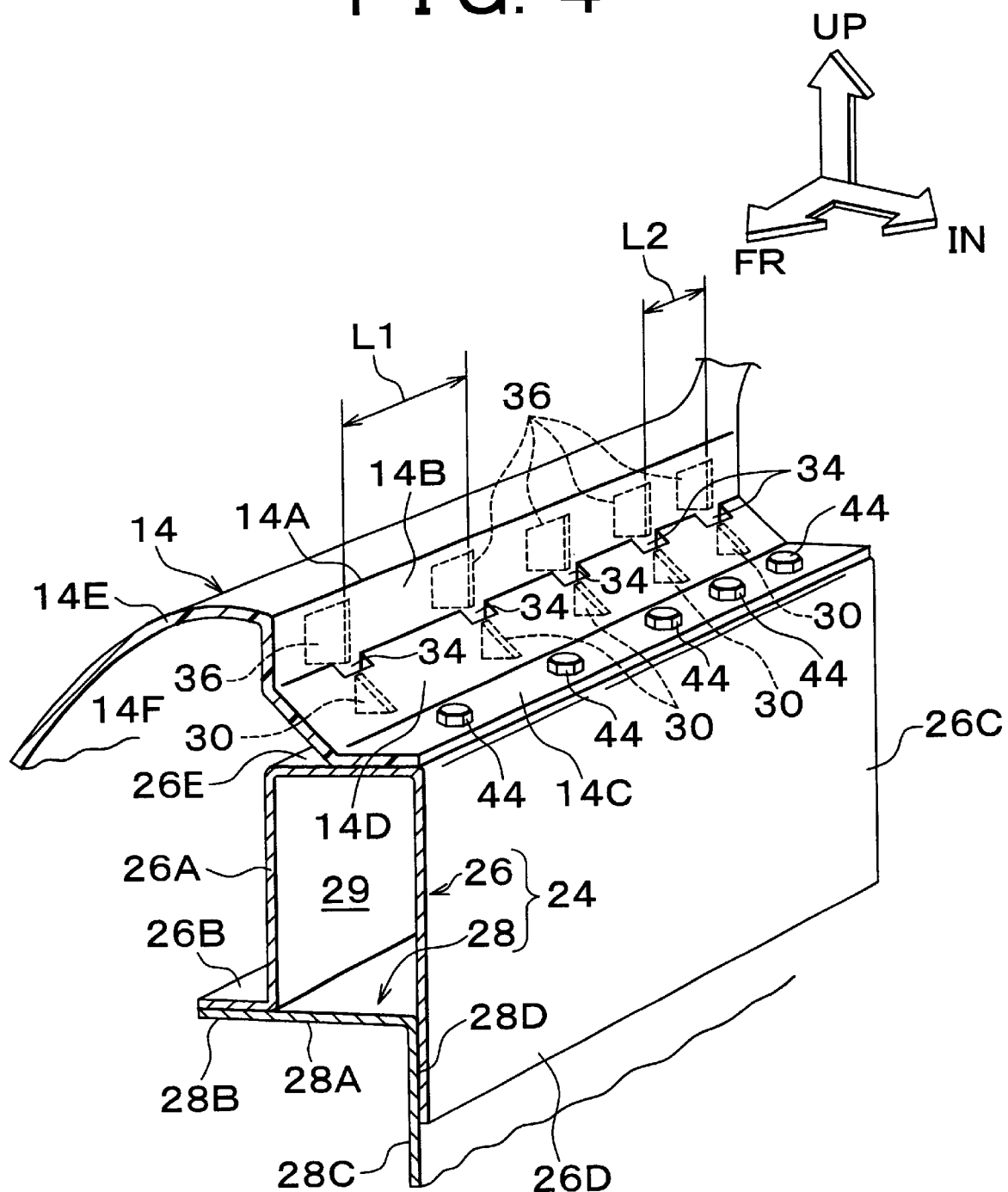
FIG. 4 is a perspective view showing the fender structure of FIG. 1, when viewed obliquely from the front, inner side of the vehicle.

Through-holes 42 are formed through the mounting portion 14C of the fender 14, and are arranged at predetermined intervals in the longitudinal direction of the vehicle, as shown in FIG. 4. A bolt 44 is inserted through each of the throughholes 42 formed through the mounting portion 14C of the fender 14, and is screwed or fastened into a weld nut 48 disposed on the lower surface of the upper wall 26E of the apron upper member 24 after passing through a corresponding through-hole 46 formed through the upper wall 26E.

Figure 2:
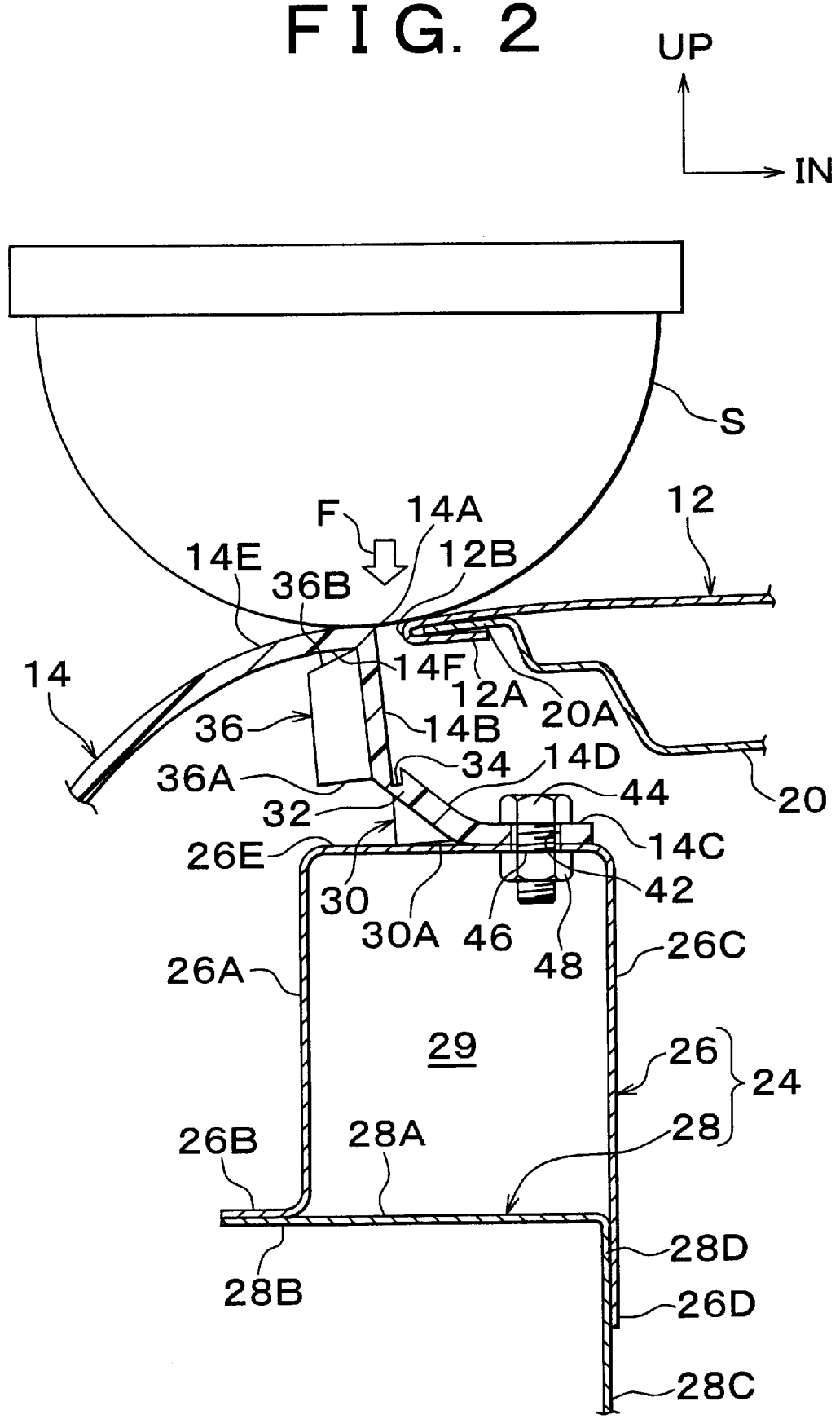
FIG. 2 is a cross-sectional view showing an operating state of the fender structure of FIG. 1 at the time of a collision with a collision body or object.
Figure 3:
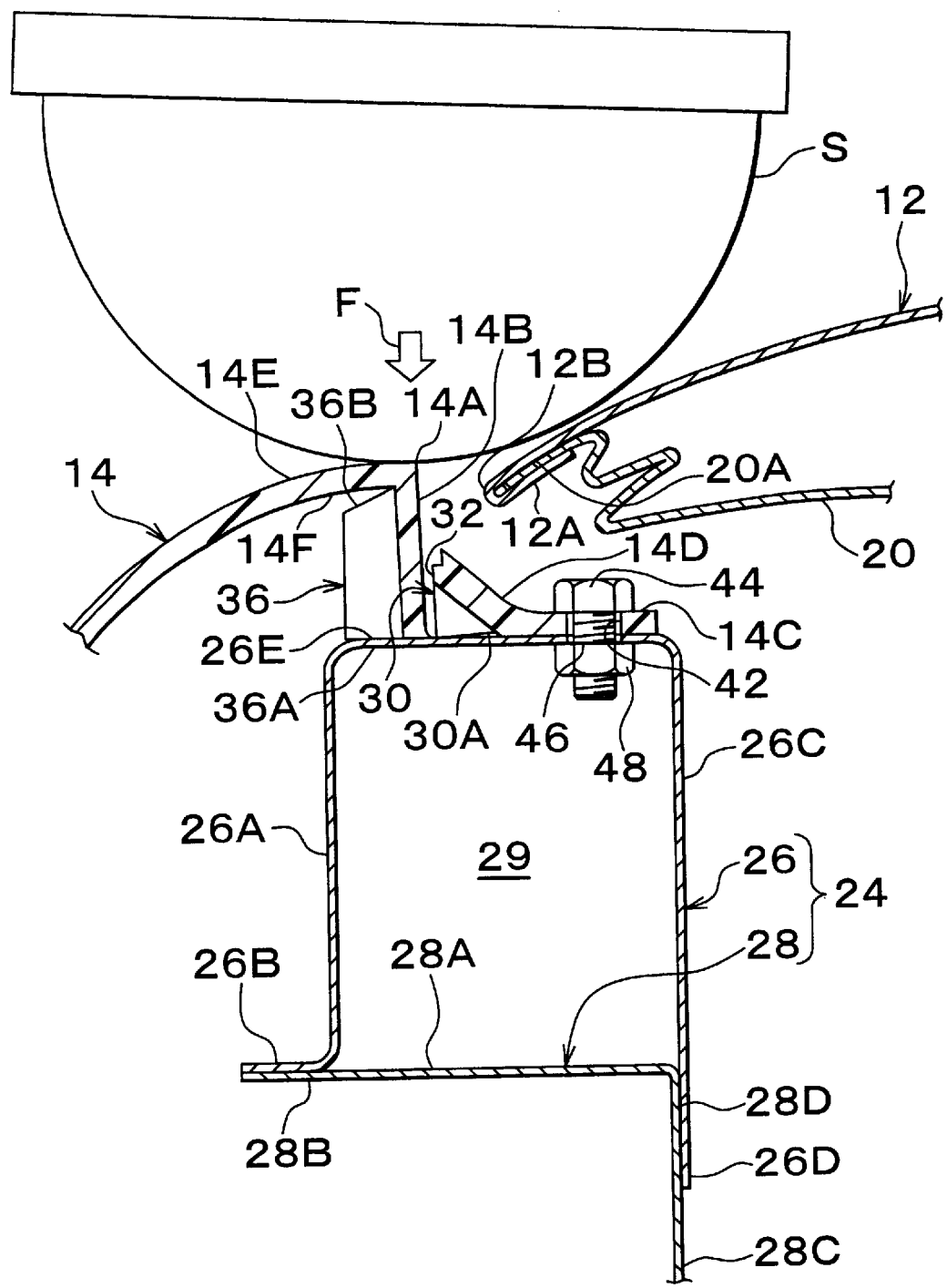
FIG. 3 is a cross-sectional view showing another operating state of the fender structure of FIG. 1 at the time of collision with the collision body.

With the above arrangement, when a load F is applied to the fender 14 from above as shown in FIG. 2, the inclined portion 14D of the fender 14 falls down, namely, is further inclined toward the apron upper member 24. As a result, the lower surface 30A of the first rib 30 abuts on the upper wall 26E of the upper member 26 of the apron upper member 24, thus causing the first rib 30 to deform to thereby absorb the energy. Subsequently, the energy is further absorbed when the fragile portion 32 of the fender 14 breaks off as shown in FIG. 3. Then, the energy is still further absorbed when the lower surface 36A of the second rib 36 abuts on the upper wall 26E of the apron upper member 24, thus causing deformation of the second rib 36.

As shown in FIG. 4, the first ribs 30, the fragile portions 32, and the second ribs 36 are formed at predetermined positions of the fender 14 arranged in the longitudinal direction of the vehicle 14. The predetermined positions may be set depending upon a required energy absorbing capability at each portion of the fender 14. For example, the intervals between the adjacent first ribs 30, or adjacent fragile portions 32, or adjacent second ribs 36, are set so as to gradually become shorter in the longitudinal direction from the front to the rear of the vehicle. For example, interval L2 in a rear portion of the vehicle is set to be shorter than interval L1 in a front portion of the vehicle, as shown in FIG. 4. Thus, the fender 14 has a relatively large energy absorbing capacity in the rear portion of the vehicle where the collision body is more likely to be an adult pedestrian, and has a relatively small energy absorbing capacity in the front portion of the vehicle where the collision body is more likely to be a child pedestrian.

Next, an operation of the present embodiment will be described. In the embodiment, when the collision body S, such as a head of a pedestrian, hits against the vicinity of the boundary line 14A of the fender 14 so that a load F is applied to the fender 14 from above as shown in FIG. 2, the inclined portion 14D of the fender 14 is further inclined toward the upper wall 26E of the upper member 26 of the apron upper member 24. As a result, the lower surface 30A of the first rib 30 abuts on the upper wall 26E of the upper member 26, thus causing the first rib 30 to deform and thus absorb the energy.

Subsequently, the fragile portion 32 of the fender 14 breaks off, thus further absorbing the energy, as shown in FIG. 3. Then, the lower surface 36A of the second rib 36 abuts on the upper wall 26E of the apron upper member 24 causing the second rib 36 to deform and still further absorb the energy.

In the embodiment as described above, the impact energy applied to the fender 14 is absorbed step by step, thus preventing a large acute stress from being applied to the fender 14 all at once. Accordingly, the impact energy can be effectively absorbed without causing damage to the outer wall 14E of the fender14.

Also, in the embodiment, the intervals between the adjacent first ribs 30, or adjacent fragile portions 32, or adjacent second ribs 36, are gradually reduced in the longitudinal direction from the front to the rear of the vehicle. For example, interval L2 in a rear portion of the vehicle is set to be shorter than interval L1 in a front portion of the vehicle, as shown in FIG. 4. Thus, the fender 14 has a relatively large energy absorbing capacity in the rear portion of the vehicle where the collision body S is more likely to be an adult pedestrian, and has a relatively small energy absorbing capacity in the front portion of the vehicle where the collision body S is more likely to be a child pedestrian. Namely, the timing and amount of impact energy absorption are appropriately controlled. As a result, an impact acting on the collision body S can be effectively reduced, even if the collision body S is an adult or child pedestrian.

Also, in the embodiment, the fragile portion 32 and the second rib 36 are formed in portions of the fender 14 other than an outer surface (or design surface) of the outer wall 14E of the fender 14. It is therefore possible to prevent a deterioration in the appearance quality of the fender 14 due to shrinkage, or the like, which may occur during production of the fender 14. Furthermore, the first ribs 30, the fragile portions 32, and the second ribs 36 can be formed as integral parts of the fender 14, and therefore the cost can be reduced as compared with the case where separate energy absorbing members are additionally formed on the fender 14.

While the invention has been described in detail with reference to the preferred embodiment thereof, it is to be understood that the invention is not limited to the preferred embodiment or construction. To the contrary, the invention is intended to cover various modifications and equivalent arrangements within the scope of the invention. For example, in the illustrated embodiment, an impact acting upon the collision body S is effectively reduced by changing the intervals between the adjacent first ribs 30, or the adjacent fragile portions 32, or the adjacent second ribs 36 between a front portion of the vehicle (interval L1) and a rear portion of the vehicle (interval L2). Alternatively, an impact acting on the collision body S may be effectively reduced by changing the size (height, width and depth) and the shape of the first ribs 30 and the second ribs 36.

Further, while the fragile portion 32 in the form of the notch 34 is provided at the boundary between the vertical wall 14B and the inclined portion 14D of the fender 14 in the illustrated embodiment, the fragile portion 32 may be provided by forming a through-hole, a recess, or the like. Also, the upper surface 36B of the second rib 36 may be designed to abut on the back surface 14F of the outer wall 14E of the fender 14.

What is claimed is:

1. A fender structure of a motor vehicle, comprising:
    a fender including a vertical wall portion, a mounting portion adapted to be mounted on an apron upper member of the vehicle, and an inclined portion formed between the vertical wall and the mounting portion, the inclined portion extending downward and inward as viewed in a width direction of the vehicle;
    at least one first rib formed on a lower surface of the inclined portion of the fender with the at least one first rib facing the apron upper member;
    at least one fragile portion formed at a boundary between the vertical wall portion and the inclined portion; and
    at least one second rib formed on a portion of the vertical wall portion of the fender located above the apron upper member, so as to extend in a vertical direction of the vehicle.

2. The fender structure according to claim 1, wherein:
    the at least one first rib, the at least one fragile portion and the at least one second rib comprise a plurality of first ribs, a plurality of fragile portions and a plurality of second ribs, respectively; and
    the first ribs, the fragile portions, and the second ribs are arranged in a longitudinal direction of the vehicle at predetermined positions of the fender so as to provide a predetermined energy absorbing capability at each of the predetermined positions.

3. The fender structure according to claim 2, wherein intervals between adjacent ones of the first ribs, the fragile portions, and the second ribs vary in the longitudinal direction of the vehicle.

4. The fender structure according to claim 3, wherein the intervals between adjacent ones of the first ribs, the fragile portions and the second ribs increase in a direction from a front side to a rear side of the vehicle.

5. The fender structure according to claim 4, wherein the intervals between adjacent ones of the first ribs, the fragile portions and the second ribs decrease in a direction from a front side to a rear side of the vehicle. wall of the apron upper member.

6. The fender structure according to claim 1, wherein the at least one second rib includes a lower surface that extends substantially parallel to a horizontal upper wall of the apron upper member.

7. The fender structure according to claim 1, wherein the at least one fragile portion comprises a notch formed between the vertical wall portion and the inclined portion of the fender.

8. A motor vehicle comprising:
    a vehicle body;
    a fender structure provided on at least one end of the vehicle body, said fender structure comprising a plurality of energy absorbers that absorb at different stages impact energy applied to the vehicle body upon a collision of the vehicle with an object wherein said fender structure further comprises:
    a vertical wall portion;
    a mounting portion adapted to be mounted in an apron upper member of the vehicle;
    an inclined portion between the vertical wall and the mounting portion;
    a first rib on a lower surface of the inclined portion;
    a fragile portion provided at a boundary between the vertical wall portion and the inclined portion; and a second rib provided on a portion of the vertical wall portion lacated above the apron upper member, extending in a vertical direction of the vehicle body.

9. A method of absorbing impact energy applied to a vehicle fender structure, comprising the steps of:

mounting a fender on an apron upper member of a vehicle, the fender having a vertical wall portion, a mounting portion, and an inclined portion formed between the vertical wall portion and the mounting portion, the inclined portion extending downward and inward as viewed in a width direction of the vehicle;

absorbing a first portion of the impact energy in a first rib formed on a lower surface of the inclined portion;

absorbing a second portion of the impact energy in a fragile portion formed between the vertical wall portion and the inclined portion; and absorbing a third portion of the impact energy in a second rib formed on a portion of the vertical wall portion located above the apron upper member so as to extend in a vertical direction of the vehicle.

10. The method of claim 9, wherein the fender structure absorbs the first, second and third portions of the impact energy sequentially.

* * * * *

UNITED STATES PATENT AND TRADEMARK OFFICE
CERTIFICATE OF CORRECTION

PATENT NO. : 6,698,820 B2
DATED : March 2, 2003
INVENTOR(S) : Yasumasa Nakata

It is certified that error appears in the above-identified patent and that said Letters Patent is hereby corrected as shown below:

<u>Column 6,</u>
Line 37, "increase" should read -- decrease --.
Lines 39-43, delete the claim in its entirety and insert therefor
-- The fender structure according to claim 1, wherein the at least one rib includes a lower surface that extends substantially parallel to an upper horizontal wall of the apron upper member. --

Signed and Sealed this

First Day of June, 2004

JON W. DUDAS
*Acting Director of the United States Patent and Trademark Office*